United States Patent
Cope et al.

(10) Patent No.: US 10,175,927 B2
(45) Date of Patent: Jan. 8, 2019

(54) DISPLAY SYSTEM AND METHOD OF USE

(71) Applicant: NanoLumens Acquisition, Inc., Norcross, GA (US)

(72) Inventors: Richard Craig Cope, Duluth, GA (US); Douglas Andrew Price, Lawrenceville, GA (US); Drew Fredrick Meincke, Woodstock, GA (US); Jorge Perez-Bravo, Alpharetta, GA (US); Joshua McKellar Byrd, Atlanta, GA (US)

(73) Assignee: NanoLumens Acquisition, Inc., Norcross, GA (US)

( * ) Notice: Subject to any disclaimer, the term of this patent is extended or adjusted under 35 U.S.C. 154(b) by 0 days.

(21) Appl. No.: 15/844,151

(22) Filed: Dec. 15, 2017

(65) Prior Publication Data

US 2018/0107442 A1    Apr. 19, 2018

Related U.S. Application Data

(63) Continuation of application No. 15/386,959, filed on Dec. 21, 2016, now Pat. No. 9,983,843, which is a
(Continued)

(51) Int. Cl.
| | |
|---|---|
| *G06F 3/14* | (2006.01) |
| *G09F 9/33* | (2006.01) |
| *G09F 21/04* | (2006.01) |
| *H04N 5/775* | (2006.01) |
| *H04N 21/414* | (2011.01) |

(Continued)

(52) U.S. Cl.
CPC .............. *G06F 3/1446* (2013.01); *F21K 9/20* (2016.08); *G06F 3/1431* (2013.01); *G09F 9/3026* (2013.01); *G09F 9/33* (2013.01); *G09F 21/04* (2013.01); *H04N 5/775* (2013.01); *H04N 21/41415* (2013.01)

(58) Field of Classification Search
CPC ..... G06F 3/1446; G06F 1/1641; H04N 5/775; H05K 5/0017; G09G 3/2003
USPC ............ 257/40, 59; 313/499, 504, 505, 506; 315/169.3; 345/76, 82; 348/383; 349/58; 359/604; 361/679.21, 809; 362/97.3; 427/66; 29/428; 340/815.4; 385/31

See application file for complete search history.

(56) References Cited

U.S. PATENT DOCUMENTS 3,947,840 A * 3/1976 Craford .................... G09G 3/32
345/82
5,747,928 A    5/1998 Shanks et al.
(Continued)

*Primary Examiner* — Gerald Gauthier
(74) *Attorney, Agent, or Firm* — Theodore Heske, III

(57) ABSTRACT

A mobile personsize display system and method of use; in general, a platform, a support frame, a module display frame, an LED panel display formed of a plurality of LED display modules having a plurality of pixels, four or more casters, a battery powered supply, a media player (electrically communicating with the plurality of display modules for controlling the display of an image(s) on the LED panel display, and a removable content storage device and; thus, functions as a rugged person size mobile, light weight, battery powered display to inform customers and passers-by about product and service offerings via a rugged person size mobile light weight battery powered display.

13 Claims, 10 Drawing Sheets

Related U.S. Application Data continuation of application No. 14/720,243, filed on May 22, 2015, now Pat. No. 9,535,649, which is a continuation of application No. 13/494,012, filed on Jun. 11, 2012, now Pat. No. 9,071,809, which is a continuation-in-part of application No. 13/297,784, filed on Nov. 16, 2011, now Pat. No. 9,330,589, and a continuation-in-part of application No. 12/348,158, filed on Jan. 2, 2009, now Pat. No. 9,013,367.

(60) Provisional application No. 61/019,144, filed on Jan. 4, 2008.

(51) Int. Cl.
*F21K 9/20* (2016.01)
*G09F 9/302* (2006.01)

(56) References Cited

U.S. PATENT DOCUMENTS

| | | | |
|---|---|---|---|
| 6,259,838 B1* | 7/2001 | Singh | G09F 9/305 385/131 |
| 6,326,900 B2* | 12/2001 | DeLine | B60K 35/00 340/425.5 |
| 6,332,690 B1 | 12/2001 | Murifushi | |
| 6,515,428 B1* | 2/2003 | Yeh | H01L 27/322 313/489 |
| 6,819,045 B2 | 11/2004 | Okita et al. | |
| 6,974,971 B2 | 12/2005 | Young | |
| 7,242,398 B2 | 7/2007 | Nathan et al. | |
| 7,636,085 B2 | 12/2009 | Yang | |
| 7,710,370 B2 | 5/2010 | Slikkerveer et al. | |
| 7,714,801 B2 | 5/2010 | Kimmel | |
| 7,825,582 B2 | 11/2010 | Furukawa et al. | |
| 7,834,537 B2 | 11/2010 | Kee et al. | |
| 7,834,962 B2 | 11/2010 | Satake et al. | |
| 7,868,545 B2 | 1/2011 | Hioki et al. | |
| 7,977,170 B2 | 7/2011 | Tredwell et al. | |
| 8,023,060 B2 | 9/2011 | Lin et al. | |
| 8,096,068 B2 | 1/2012 | Van Rens | |
| 8,097,812 B2 | 1/2012 | Wang et al. | |
| 8,098,486 B2 | 1/2012 | Hsiao | |
| 8,104,911 B2* | 1/2012 | Hillman | G02F 1/133603 362/555 |
| 8,228,667 B2 | 7/2012 | Ma | |
| 8,284,369 B2 | 10/2012 | Chida et al. | |
| 8,319,725 B2 | 11/2012 | Okamoto et al. | |
| 8,456,078 B2 | 6/2013 | Hashimoto | |
| 8,471,995 B2 | 6/2013 | Tseng | |
| 8,477,464 B2 | 7/2013 | Visser et al. | |
| 8,493,520 B2 | 7/2013 | Gay et al. | |
| 8,493,726 B2 | 7/2013 | Visser et al. | |
| 8,654,519 B2 | 2/2014 | Visser | |
| 8,780,039 B2 | 7/2014 | Gay et al. | |
| 8,816,977 B2 | 8/2014 | Rothkopf et al. | |
| 8,873,225 B2 | 10/2014 | Huitema et al. | |
| 8,982,545 B2 | 3/2015 | Kim et al. | |
| 9,092,196 B2* | 7/2015 | Yoo | G06F 1/1641 |
| 9,117,384 B2 | 8/2015 | Phillips et al. | |
| 9,176,535 B2 | 11/2015 | Bohn et al. | |
| 9,262,118 B2* | 2/2016 | Scheibe | G06F 3/1446 |
| 9,286,812 B2 | 3/2016 | Bohn et al. | |
| 9,335,793 B2 | 5/2016 | Rothkopf | |
| 9,342,266 B2* | 5/2016 | Scheibe | G06F 3/1446 |
| 9,372,508 B2 | 6/2016 | Wang | |
| 9,459,656 B2 | 10/2016 | Shai | |
| 9,536,463 B2* | 1/2017 | Scheibe | G06F 3/1446 |
| 2002/0125820 A1* | 9/2002 | Sheu | H01L 27/322 313/505 |
| 2004/0115339 A1* | 6/2004 | Ito | G02B 5/201 427/66 |
| 2005/0258745 A1* | 11/2005 | Tsujimura | H01L 27/3246 313/506 |
| 2005/0285990 A1* | 12/2005 | Havelka | G02F 1/133308 349/58 |
| 2006/0038484 A1* | 2/2006 | Noh | C07D 487/16 313/499 |
| 2006/0098153 A1 | 5/2006 | Slikkerveer et al. | |
| 2006/0108918 A1* | 5/2006 | Cok | H01L 27/3288 313/506 |
| 2006/0204675 A1 | 9/2006 | Gao et al. | |
| 2007/0046178 A1 | 3/2007 | Imai | |
| 2007/0058257 A1* | 3/2007 | Lynam | B60Q 1/2665 359/604 |
| 2007/0070031 A1 | 3/2007 | Shoji | |
| 2007/0096096 A1* | 5/2007 | Kuwabara | G02F 1/136286 257/59 |
| 2007/0241002 A1 | 10/2007 | Wu et al. | |
| 2008/0042940 A1 | 2/2008 | Hasegawa | |
| 2008/0046767 A1 | 2/2008 | Hsu et al. | |
| 2008/0158107 A1* | 7/2008 | Miller | G09G 3/22 345/76 |
| 2008/0218369 A1 | 9/2008 | Krans et al. | |
| 2008/0290790 A1* | 11/2008 | Jin | H01L 27/3246 313/504 |
| 2009/0015998 A1* | 1/2009 | Havelka | G02F 1/133308 361/679.21 |
| 2009/0033604 A1 | 2/2009 | Silzars | |
| 2009/0051282 A1 | 2/2009 | Ueda | |
| 2009/0072693 A1 | 3/2009 | Cok | |
| 2009/0141488 A1 | 6/2009 | Silverstein | |
| 2009/0174638 A1 | 7/2009 | Brown Elliott | |
| 2009/0184900 A1 | 7/2009 | Le Roy | |
| 2009/0189917 A1 | 7/2009 | Benko et al. | |
| 2011/0134144 A1 | 6/2011 | Moriwaki | |
| 2012/0002360 A1 | 1/2012 | Seo et al. | |
| 2012/0092363 A1 | 4/2012 | Kim et al. | |
| 2012/0236509 A1 | 9/2012 | Cope et al. | |
| 2012/0251072 A1 | 10/2012 | Cope et al. | |
| 2012/0313862 A1 | 12/2012 | Ko et al. | |
| 2013/0100392 A1 | 4/2013 | Fukushima | |
| 2013/0271940 A1 | 10/2013 | Cope et al. | |
| 2014/0137384 A1* | 5/2014 | Patterson | G06F 3/1446 29/428 |

\* cited by examiner ber # DISPLAY SYSTEM AND METHOD OF USE

CROSS REFERENCE TO RELATED APPLICATIONS

This non-provisional utility application is a continuation of and claims the benefit of non-provisional utility application Ser. No. 15/386,959, entitled "Mobile, Personsize Display System and Method of Use", filed Dec. 21, 2017. application Ser. No. 15/386,959 is a continuation of non-provisional utility application Ser. No. 14/720,243, entitled "Mobile, Personsize Display System and Method of Use" filed May 22, 2015. application Ser. No. 14/720,243 is a continuation of non-provisional utility application Ser. No. 13/494,012, entitled "Mobile, Personsize Display System and Method of Use" filed Jun. 11, 2012. application Ser. No. 13/494,012 is a continuation-in-part of non-provisional utility application Ser. No. 13/297,784, entitled "System for Facilitating Virtual Presence", filed on Nov. 16, 2011, and application Ser. No. 12/348,158, entitled "Flexible Display", filed on Jan. 2, 2009. application Ser. No. 12/348,158 claimed priority from U.S. provisional patent Application No. 61/019,144, filed on Jan. 4, 2008. application Ser. Nos. 15/386,959, 14/720,243, 13/494,012, 13/297,784, 12/348,158 and 61/019,144 are incorporated herein by reference.

TECHNICAL FIELD

The disclosure generally relates to mobile displays and more specifically, it is related to a mobile, low profile, light-weight hazard-free display system.

BACKGROUND

As is widely known, to present goods for sale to the public in a store setting or other private or public venue or establishment, merchants use stationary plastic, wooden or metal displays, walls, surfaces, tables, shelves and racks having surfaces on which goods offered for sale may be displayed to inform customers and passers-by about product and service offerings. Another known display system the stationary pep or slotted board display wall, surface, table, shelf, and rack wherein a variety hangers, such as hooks may be positioned to assemble a wall or surface of hangers to orderly position goods for sale and to enable easy access to such goods. Such static display racks may include adjustable shelving or surfaces to display a variety of goods and services and allow for individualized positioning and placement of such goods. Moreover, such static display racks may enable placement of static marketing and advertising materials, such as posters and flyers; which may be positioned approximate such goods. Still further, such static display racks may include an audio or video display, such as CRT, TV LCD monitor, positioned within the static display racks to enable a customer positioned, right next to the display, to see and hear marketing advertising content relating to the sale of the goods positioned in the static display racks.

CRT, TV, LCD monitor, and like displays have many drawbacks: such displays are stationary or immobile displays due to their hazardous weight and tip over potential, and therefore must be enclosed in an immobile frame for support. Moreover, such displays have glass fronts or covers, such as CRT and LCD, and can cause serious injury when bumped or dropped resulting in an explosion or shards of glass in the viewing area. Furthermore, large displays having glass fronts and covers, such as CRT and LCD, are heavy, thick and bulky and are cumbersome or difficult to move easily and quickly about the merchant's venue, especially during product liquidations and mark downs or seasonal or theme reconfigurations or changes, wherein the footprint of the store is significantly altered or redesigned. Still further, large displays, such as CRT and LCD, consume large amounts of power and generate heat in the process making them expensive to operate and maintain. Yet, still further, such displays are not proportional in size to a viewer having smaller or partial sized avatar or digital mannequin images which fail to extend from the floor to up above the viewer; therefore, such images limit the viewer's experience of interacting with a full size avatar or digital mannequin. Such unnatural or partially sized avatar or digital mannequin images tend to reduce or limit the willingness of a customer to interact with such digital content; thus, reducing the displays effectiveness of informing customers and passers-by about products and service offerings, and answering informational requests.

In addition, large mobile displays, such as CRT and LCD, are in use for medical, dental and spa establishments where a CRT or LCD display, computer, printer, and AC power supply connection are positioned on or integrated into a table top or wheeled table top assembly. For example, a 46 inch LCD may be mounted on a mobile display rotated in portrait mode and a miniature scale image of a person may be displayed on the LCD screen. In other applications, LCDs may be stacked side-by-side to create a larger image but create visible seams that distort and segment the visual image into areas or sectors. These bezels create significant disruption an interruption of the visual image as seen by the viewer.

CRT or LCD displays have drawbacks such as they utilize heavy hard. to move high resolution CDT or LCD displays with glass fronts or covers. Such displays can cause serious injury when bumped or tipped over resulting in an explosion or shards of glass in the viewing area. Because of this risk the table top or wheeled table top includes large, heavy frames and support structures to stabilize such displays causing the display portion to be several inches or feet off of the floor. Moreover, these large scale displays tend to be heavy, expensive to operate, not easily transported and set up, and are power hungry.

Furthermore, it is also known to place print material on external surfaces of vehicles, such as city buses and motorized trucks to publicly display marketing and advertising materials to inform customers and passers-by about product and service offerings.

Moreover, it is also known to incorporate a single capture device, such as a camera which is often positioned above or below the viewer to integrate external audio, still frames, or video content into the display system or display system content; however, integrating content, such as downward perspective or upward perspective from such capture device does not create a full size, proper dimensional or perspective image of the viewer. Rather such capture device captures a distorted perspective visual of a viewer or passers-by.

Lastly, LCDs have been mounted in portrait mode having the long side of the LCD positioned vertically. This vertical LCD is mounted on a stand and placed on the floor of a retailer or other establishment. The problem with this vertical LCD is that they are not full person size. For example, the LCD may be 46-54 inches diagonally and any image displayed thereon will appear as an unnatural miniaturized person scaled to fit on the display. Moreover, LCDs have large frames around the border of the LCD causing the screen portion to be elevated off the ground giving the appearance of an unnatural floating image of a person displayed on the screen.

Therefore, it is readily apparent that there is a recognizable unmet need for a mobile, personsize (6 foot or more high 3 foot or more wide; personsize) display system and method of use that safely and economically functions to inform customers and passers-by about product and service offerings via rugged full personsize mobile, with the bottom of the display as close to the floor as practically possible, light weight, thin, battery powered display and; thereby, enables full personsize viewing, quick redesign and configuration changes to the merchant's establishment without the need for heavy moving dollies, skids and other moving equipment, or any special tools or special power requirements or power alterations to operate the mobile display system.

SUMMARY

Briefly described, in an example embodiment, the present apparatus and method overcomes the above-mentioned disadvantages and meets the recognized need for a mobile, personsize display system and method of use that extends down to the floor; in general, a platform, a support frame configured to extend approximate the floor, a personsize display frame, an LED panel display formed of a plurality of LED display modules having a plurality of pixels, a plurality of casters, a battery powered supply, a media player (electrically communicating with the plurality of display modules for controlling the display of an image(s) on the LED panel display, and a removable content storage device; thus, functions as a rugged personsize mobile, light weight, battery powered display to inform customers and passers-by about product and service offerings.

The depth of the plurality of display modules, module display frame, support frame and electronic support member is preferably less than four inches when defining a display assembly. Also, the display assembly has a screen size measured width by height by depth in a range of approximately 30 inches by 70 inches by two inches and a weight in the range of 90 pounds to 120 pounds and wherein the display assembly has an aspect ratio ranging from 1.67 to 1.82.

In use, mobile display system and method thereof enables quick redesign and configuration changes to the merchant's establishment without the need for heavy moving dollies, skids and other moving equipment, or any special tools or special power requirements or power alterations to operate the mobile display system.

According to its major aspects and broadly stated, the present apparatus meets the recognized need for a mobile display system and method thereof comprising a base having one or more caster affixed thereto, a support structure configured to extend therefrom said base, a sub-frame supported by said support structure, one or more display sub-assemblies configured with a plurality of light emitters, said one or more display sub-assemblies configured to be releasably affixed to said sub-frame to form a flat panel display, a media player configured to communicate content to said one or more display sub-assemblies, and a portable power supply configured to power said one or more display sub-assemblies of said flat panel display.

In a further exemplary embodiment of a method of mobile display system and method thereof comprising the steps of providing a mobile display system with a base having one or more caster affixed thereto, a support structure configured to extend therefrom said base, a sub-frame supported by said support structure, one or more display sub-assemblies configured with a plurality of light emitters, said one or more display sub-assemblies configured to be releasably affixed to said sub-frame to form a flat panel display, a media player configured to communicate content to said one or more display sub-assemblies, and a portable power supply configured to power said one or more display sub-assemblies of said flat panel display, positioning said mobile display system in a first position by rolling said casters, operating said mobile display system in said first position, re-positioning said mobile display system in a second position by rolling said casters, and operating said mobile display system in said second position.

Accordingly, a feature of the mobile display system and method thereof is its ability to inform customers and passers-by about product and service offerings.

Another feature of the mobile personsize display system and method thereof is its ability to provide a rugged person size mobile light weight battery powered display.

Yet another feature of the mobile personsize display system and method thereof is its ability to provide quick redesign and configuration changes to the merchant's establishment without the need for heavy moving dollies, skids and other moving equipment.

Yet another feature of the mobile personsize display system and method thereof is its ability to provide quick redesign and configuration changes to the merchant's establishment without the need for any special tools or special power requirements or power alterations to operate the mobile display system.

Yet another feature of the mobile personsize display system and method thereof is its ability to provide a mobile display system having at least one display screen mounted on a mobile platform with a front surface exposed externally thereof, operable to generate images on mobile display so as to be visible on said front and/or back surface.

Yet another feature of mobile personsize display system and method thereof is its ability to provide planar body housing capable of supporting a person sized display.

Yet another feature of mobile personsize display system and method thereof is its ability to provide a full person sized display capable of displaying a natural sized image of a person 3-5 wide by 6-7 feet in height (personsized) without scaling the image to fit the display.

Yet another feature of mobile personsize display system and method thereof is its ability to provide a frameless or virtually frameless display capable of being positioned with its lower edge in contact or almost in contact with a common surface of the viewer to prevent the appearance of an unnatural floating image of a person displayed on the screen.

Yet another feature of mobile personsize display system and method thereof is its ability to provide planar body housing and platform capable of supporting personsize display from approximately the floor to above the viewer's head or arms.

Yet another feature of the mobile personsize display system and method thereof is its ability to provide a display capable of generating a personsize image on the display.

Yet another feature of mobile personsize display system and method thereof is its ability to replicate a full size mirror image of the viewer on the display and/or integrate product or service offerings with the image of the viewer.

Yet another feature of the mobile personsize display system and method thereof is its ability to provide a display capable of generating a full size mirror image of the viewer on the display.

Yet another feature of the mobile personsize display system and method thereof is its ability to provide a display capable of manipulating a full size mirror image of the viewer on the display and integrate product or service offerings with the image of the viewer.

Yet another feature of the mobile personsize display system and method thereof is its ability to provide a display capable of producing a human like full size avatar or digital mannequin to engage and communicate with for directions, information, special offers, coupons or other incentives, previews and the like.

Yet another feature of the mobile personsize display system and method thereof is its ability to provide telepresence.

Yet another feature of the mobile personsize display system and method thereof is its ability to provide a system for facilitating virtual presence.

Yet another feature of the mobile personsize display system and method thereof is its ability to provide a system with no visible seam or bezels in the display area.

Yet another feature of the mobile personsize display system and method thereof is its ability to provide a rugged commercial floor display.

Yet another feature of the mobile personsize display system and method thereof is its ability to provide a bump resistant display.

Yet another feature of mobile personsize display system and method thereof is its ability to provide a light weight and easily portable display system.

Yet another feature of the mobile personsize display system and method thereof is its ability to provide a battery powered and rechargeable display system, which is not dependent on the availability of power at the advertising location.

Yet another feature of the mobile personsize display system and method thereof is its ability to provide an on-board media player wherein a removable storage device, such as a thumb drive, may be plugged into the media player to quickly display or modify the content on the mobile display system.

Yet another feature of the mobile personsize display system and method thereof is its ability to provide a built in receiver or transmitter to collect external data to enable a viewer to interaction with, provide feedback to, and/or integrate an image with the mobile display system, such as a camera to integrate an image of the viewer with a product/service offering to entice or engage a viewer of the mobile display system to interaction with, provide feedback, and/or purchase a product/service offering.

Yet another feature of the mobile personsize display system and method thereof is its ability to provide a full size automated person or virtual person to interact with/to ask questions and receive answers, such as direction with video and audio response, maps and the like.

Yet another feature of the mobile personsize display system and method thereof is its ability to utilize such digital signage in public and private environments, such as retail stores, kiosks, casinos, hotels, restaurants airports, corporate buildings and the like.

Yet another feature of the mobile personsize display system and method thereof is its ability to provide touch screen functionality integrated into the display.

Yet another feature of the mobile personsize display system and method thereof is its ability to provide an audio system integrated with the display, including a wireless microphone and speakers to further provide a mobile audio and visual presentation system.

These and other features of the mobile display system and method thereof will become more apparent to one skilled in the art from the following Brief Description of the Drawings, Detailed Drawings, Detailed Description and Claims when read in light of the accompanying drawings.

BRIEF DESCRIPTION OF THE DRAWINGS

The present mobile personsize display system and method thereof or the like will be better understood by reading the Detailed Description of the embodiments with reference to the accompanying drawings, in which like reference to numerals denote similar structures and refer to like elements throughout, and in which:

FIG. 1A and 1B are perspective, 1C front and 1D side views of the mobile personsize display system;

FIG. 7, collectively.

Figure 1:
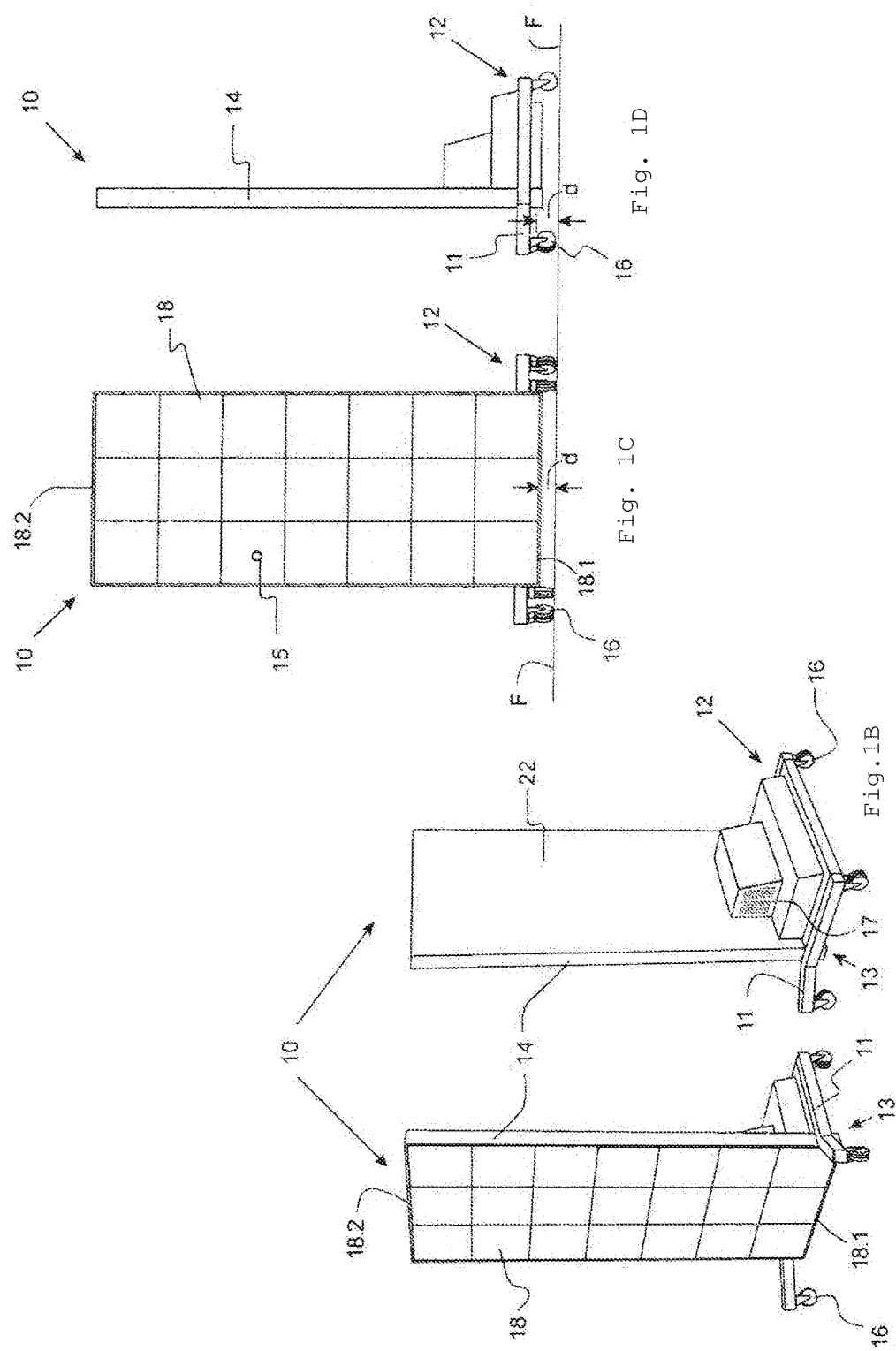
FIG. 1, collectively.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-9 specific terminology is employed for the sake of clarity. The present disclosure; however, is not intended to be limited to the specific terminology so selected, and it is to be understood that each specific element includes all technical equivalents that operate in a similar manner to accomplish similar functions. Embodiments of the claims may; however, be embodied in many different forms and should not be construed to be limited to the embodiments set forth herein. The examples set forth herein are non-limiting examples, and are merely examples among other possible examples.

For purposes of teaching and not limitation, the exemplary embodiments disclosed herein are discussed mainly in the context of LED light emitter technologies. However, the present invention is applicable to other light emitting technologies as well, such as, by way of example and not limitation, light emitting diodes (LED), liquid crystal display (LCD), backlit LCDs, organic light emitting diodes (OLED), electroluminescence, plasma tubes or cells, plasma display panels (PDP), and the like.

Referring now to FIGS. 1A to 1D by way of example, and not limitation, there is illustrated an example embodiment of the portable personsize media player, moveable video and audio presentation system, such as mobile display system 10. Preferably, mobile display system 10 includes a stage or platform, such as base 12 configured to support mobile display system 10, a frame, edge or mount, such as support structure 14, and two or more wheels or rollers, such as casters 16 to permit the base 12 and attached support structure 14 to be readily moved by rolling mobile display system 10 from place to place. Casters 16 are preferably removeably affixed to base 12 (likely on its underside) and provide contact support to a surface viewing area, such as floor F. Alternatively, casters 16 may be positioned or releasably affixed approximate outer edge 11. or corner 13 of base 12. Support structure 14 may be configured as solid or hollow member(s) having tubular or rectangular beam cross-section or the like to permit power and data cabling to run therein. Flat panel display 18 preferably includes a monitor or display device, whether single sided or two sided with front and back displays, flat panel display 18, including light emitting diodes (LED) and other light emitting technologies as well; such as, by way of example and not limitation, liquid crystal display (LCD), backlit LCDs, electroluminescence, plasma tubes or cells, or plasma display panels (PDP) (light emitters), touch screen technology, all included as flat panel display 18 or subassemblies thereof and configured to display images, read input information (touch screen) or other audio/video content or data thereon. Furthermore, support structure 14 is preferably configured to support therefrom base 12 whether as a perimeter frame support around flat panel display 18 or as vertical support approximate flat panel display 18. Moreover, support structure 14 may be integrated with back panel to form a support cover, such as pan 22 to support and incase flat panel display 18. As may be contemplated herein base 12 and/or support structure 14 may serve as a platform for housing hardware such as a computer, power supplies, external electronics and storage equipment, an audio/video player, audio output device(s), such as speaker 17 or the like used in conjunction with flat panel display 18. It is contemplated herein that configurations other than shown for base 12 and/or support structure 14 may be utilized herein or others known to one of ordinary skill in the art.

It is contemplated herein that flat panel display 18 and/or one or more display sub-assemblies may incorporate touch screen technology to integrate feedback from a viewer of flat panel display 18.

It is contemplated herein that flat panel display 18 and/or outer edge 11, corner 13, base 12, support structure 14, pan 22 may be configured to position display edge 18.1 of flat panel display 18 in close proximity to floor F; thus to enable a personsize display from close proximity of floor F to above the viewer's head or arms for display edge 18.2. Moreover, with display edge 18.1 of flat panel display 18 in close proximity to floor F and display edge 18.2 above a viewer's head or extended arms flat panel display 18 may provide a display capable of generating a personsize image on the display. The personsize image beginning at floor F preferably creates a natural human image verses a floating, partial, smaller, suspended, and/or unnatural human image if flat panel display 18 does not extend to floor F. Such unnatural human image is disproportional to viewer reference point when standing on floor F and such unnatural image or incorrect perspective image causes a viewer to become disinterested in interacting with mobile display system 10. It is further contemplated herein that display edge 18.1 of flat panel display 18 may be preferably zero to five (0-5") inches above floor F (minimal distance) and more specifically one to two (1-2") inches distance d above floor F, to create a natural image and a positive interaction with mobile display system 10, shown in FIGS. 1C and 1D.

It is contemplated herein that display edge 18.1 of mobile display system 10 is preferably as close to the floor as practically possible to create the visual image of another person actually standing in front of the viewer. This full-size image with its feet on the ground as a person would actually have has the ability to create confusion in the viewer's mind over whether that's an actual person or an image generated screen.

By mobile display system 10 creating the visual and mental perception that a real person is standing in front of a viewer this allows you to see clothing and/or merchandise in full-size on an image of the viewer in full-size standing on the ground in front of the viewer.

Base 12, pan 22, and/or support structure 14 are preferably formed, molded or configured from a suitable material, such as expanded metal, aluminum, sheet metal, plastic, or alternative resin, fiber, fiber reinforced, wood, stainless steel, rigid support material or the like and any manufacturing method, capable of providing structure to base 12 and/or support structure 14. Preferably, the material includes other suitable characteristics, such as strength, rigidity, durability, water-resistance, light weight, smooth surface, textured surface, soft or impact resistant surface, paintability, chemical inertness, oxidation resistance, safety, ease of portability, longevity, or other beneficial characteristic understood by one skilled in the art.

It is further contemplated herein that flat panel display 18 may include any display technology or display modules known to one of ordinary skill in the art are incorporated herein, including monitors, display device including light emitting diodes (LED) and other light emitting technologies as well; such as, by way of example and not limitation, liquid crystal display (LCD), backlit LCDs, organic light emitting diodes (OLED), electroluminescence, plasma tubes or cells, or plasma display panels (PDP) and the like (light emitters).

It is further contemplated herein that trademarks, product logos, or other product branding identifiers, such as indicia may be positioned on the surface of base 12, pan 22, outer edge 11 and/or support structure 14.

It is still further contemplated herein that mobile display system 10 may include flat panel display 18 on one or more sides of mobile display system 10.

It is still further contemplated herein that mobile display system 10 may enable placement of advertising materials, audio/video and and/or other content on flat panel display 18 associated with the offering of goods and/or services (products), wherein mobile display system 10 may be positioned approximate such offerings of goods and/or services (functionality).

It is still further contemplated herein that mobile display system 10 may enable placement of advertising materials, audio/video and and/or other content on flat panel display 18 associated with the offering of goods and/or services (products), wherein mobile display system 10 may be integrated with offerings of goods and/or services (products) (functionality).

It is still further contemplated herein that mobile display system 10 may enable placement of advertising materials, audio/video and and/or other content and/or educational materials on flat panel display 18, which may provide a viewer with help, instructions, and/or information (functionality).

It is still further contemplated herein that mobile display system 10 may enable placement of advertising materials, audio/video and and/or other content and/or educational materials on flat panel display 18 based on feedback from capture device 15 (feedback technology), which may provide a viewer with a customized viewing experience, help, instructions, and/or information (functionality).

It is still further contemplated herein that the functionality and the like set forth herein the Summary section above is functionality of mobile display system 10 (functionality).

Still further, such static display racks may include an audio or video display such as TVs, LCD monitor, positioned proximate or within the static display racks to enable a customer positioned next to the display to see and hear marketing and advertising content relating the sale of the goods positioned in the static display racks.

It is still further contemplated herein that base 12, flat panel display 18 and/or support structure 14 may include one or more audio/still/video, microphone, digital or video camera, capture devices, sensors or other transmitters or receivers, and/or touch screen technology, such as capture device 15 for added functionality (functionality), shown in FIG. 1C, Preferably, one or more capture device 15 may be integrated into the pixel matrix of flat panel display 18 and/or one or more display sub-assemblies and utilized to capture images and/or audio of persons, objects and/or background imagery and sound or other content or data, such as environmental data created within the surroundings of mobile display system 10 (functionality). Such environmental data may be integrated into the content displayed or projected from mobile display system 10. For example, customer(s) within a retail environment may be standing in front of mobile display system 10. Capture device 15 may capture environmental data, such as imagery and sounds emanating from customer(s) or viewer(s) and display or project such environmental data from mobile display system 10 or integrate such environmental data into the content being displayed or projected, such as product or service offerings being displayed or projected from mobile display system 10. For example, capture device 15 may capture a viewer's image and recreate their image on mobile display system 10 with the viewer shown wearing a clothing line, which is offered for sale; thus, providing an integrated, representative, marketing image of the viewer and the product or service offering.

It is contemplated herein that capture device 15 may include a single sensor device disposed within the active visual area of flat panel display 18 or multiple sensor devices disposed within the active visual area of flat panel display 18. The type, number, and position of the capture device 15 may vary depending on the application. In the preferred embodiment, capture devices 15 are populated at varying heights and widths within the active visual area to capture multiple images to generate a full perspective image for display, storage, and/or distribution.

Figure 2:
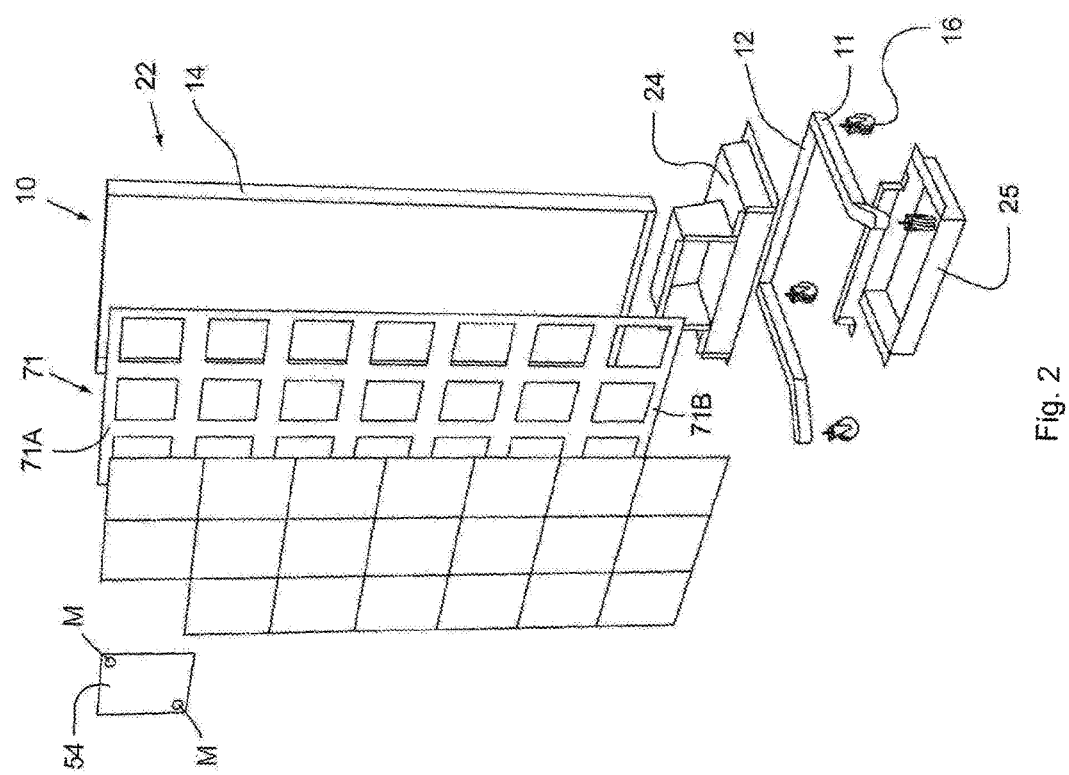
FIG. 2 is an exploded view of the mobile personsize display system of FIG. 1.

Referring now to FIG. 2 by way of example, and not limitation, there is illustrated an example embodiment of the portable media player, moveable video and audio presentation system, such as mobile display system 10, shown in an exploded view. As shown base 12 may include a variety of configuration, such as a square, rectangle, circle (shown), or oval connected to support structure 14 and/or pan 22. Moreover, referring again to FIG. 1, two or more support arms 11 may be configured as solid or hollow members having tubular or rectangular beam cross-section or the like with an interconnecting structure such as base 12 connected to support structure 14 and/or pan 22. Moreover, support arms 11 may include casters 16 (shown in FIG. 3) positioned on the ends and corners of support arms 11 to permit rolling mobile display system 10 from place to place. Furthermore, base 12 may include panels, such as covers 24 and 25 to support or enclose hardware systems of mobile display system 10. It is contemplated herein that other covers 24 and 25 or support structured may be utilized herein.

Still further, pan 22 preferably includes inner panel, surface, frame or cross bars, such as sub-frame 71 supported by support structure 14 and/or pan 22, and further includes vertical members 71A and horizontal members 71B configured to cross one another forming a lattice framework to releasably affix each of one or more display sub-assemblies 54 thereto. Moreover, each of one or more display sub-assemblies 54 is releasably affixed to vertical members 71A and/or horizontal members 71B by magnetic M connection or other the like attachment mechanisms. For example, if vertical members 71A and horizontal members 71B are formed of steel or other ferrous material then magnets M may be affixed to the perimeter of each of one or more display sub-assemblies 54 to releasably affix each of one or more display sub-assemblies 54 to vertical members 71A and/or horizontal members 71B. Alternatively, if vertical members 71A and horizontal members 71B are formed of aluminum or other nonferrous material then magnets or the like may be affixed to vertical members 71A and horizontal members 71B and magnets M or the like may be affixed to the perimeter of each of one or more display sub-assemblies 54 to releasably affix each of one or more display sub-assemblies 54 to vertical members 71A and/or horizontal members 71B. It is contemplated herein that sub-frame 71 may be configured other than as lattice framework. It is further contemplated herein that other attachment mechanisms may be utilized herein to releasably affix of one or more display sub-assemblies 54 to vertical members 71A and/or horizontal members 71B.

Figure 3:
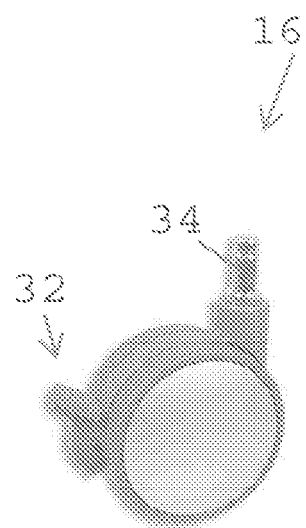
FIG. 3 is a perspective view of caster of FIG. 1.

Referring now to FIG. 3 by way of example, and not limitation, there is illustrated an example embodiment of caster 16. Preferably caster 16 is an un-driven, single, double, or compound wheel designed to be mounted to the bottom or underside of base 12 shown in FIG. 1 and FIG. 2. Caster 16 is preferably configured to enable mobile display system 10 shown in FIG. 1 and FIG. 2, to be easily moved from place to place. Caster 16 is available in various sizes and shapes and may be made of rubber, plastic, nylon, aluminum, or stainless steel. Preferably caster 16 further includes a brake, such as lock mechanism to enable locking of casters 16 to prevent the wheel from turning and prevent mobile display system 10 from being rolled about and the unlocking thereof lock mechanism 32 to enable the rolling of mobile display system 10 from place to place. Furthermore, caster 16 may be rigidly affixed to base 12 or pivotally affixed to base 12 via pin to enable 360 degrees of rotation, thus enabling the wheel to roll in any direction.

As will be appreciated, the various embodiments of mobile display system provide substantial benefits in terms of the mobility and manipulation of systems utilizing flat panel display 18 shown in FIG. 1. In particular, both the monitor and all supporting devices and the like may be readily transported from place to place without the need to disconnect components.

Figure 4:
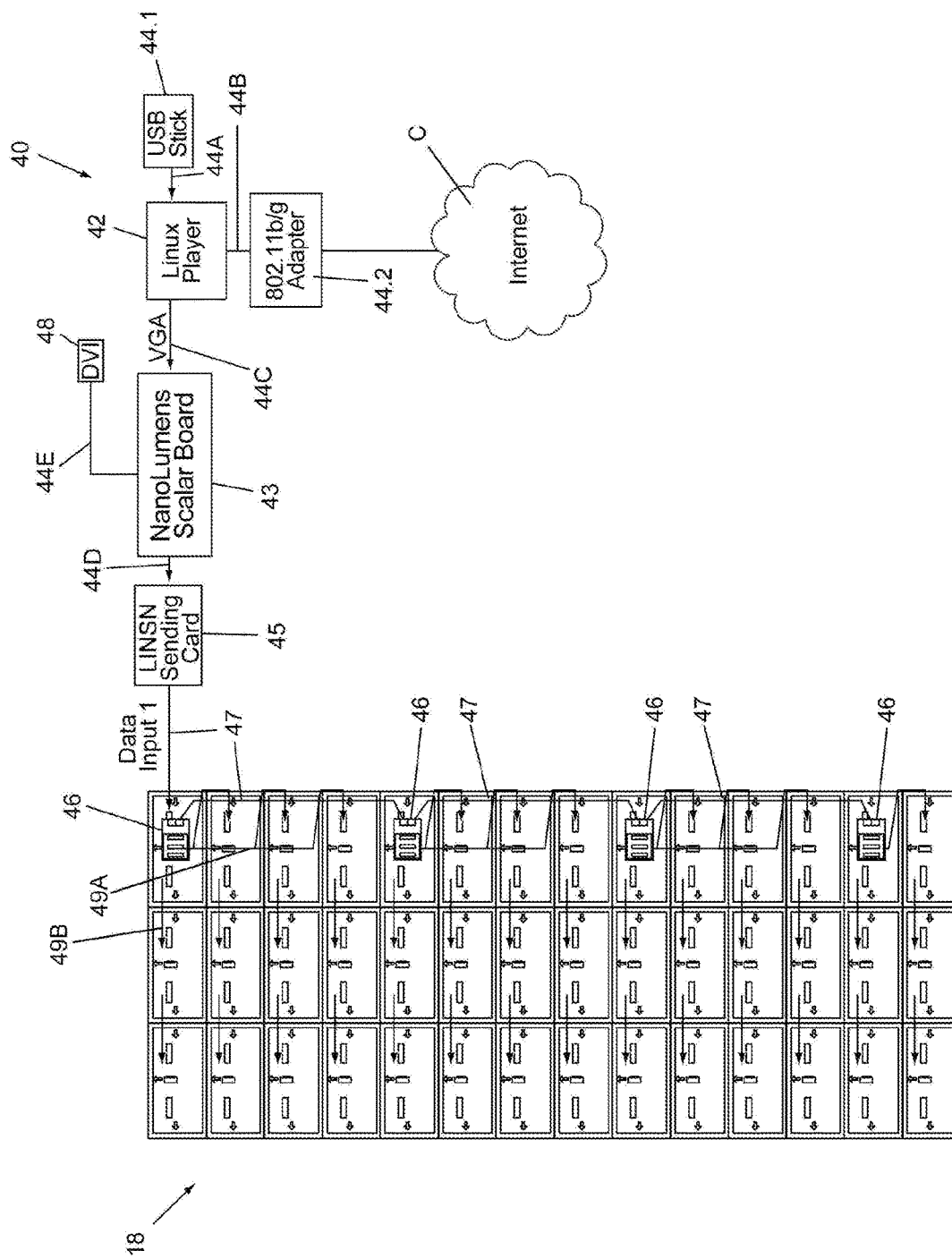
FIG. 4 is a block diagram of an exemplary media player in use in FIG. 1.

Referring now to FIG. 4 by way of example, and not limitation, there is illustrated an example embodiment of a block diagram of an exemplary audio/video content (data) player and distribution system, such as media player 40. Preferably, media player 40 may be housed internal to covers 24 and 25, affixed to base 12 and/or support structure 14 or positioned on an exterior surface of base 12 and/or support structure 14, or positioned remotely from flat panel display 18 or the like. Preferably, audio/video content (data) media player and distribution system 40 includes a commercially available media player, computer or the like, such as media player 42, which further includes one or more subsystems such as processor, memory, integrated circuits, data storage, in/output communication electronics, protocol, software (such as digital signage software), firmware, connections, buses, cables, adapters and/or in/outport(s) 44. Media player 42 operating digital signage software is preferably utilized to control digital imagery, such as television programming, video content, menus, information, advertising and other visual data, viewable on flat panel display 18. Moreover, in/output ports 44 include universal serial bus USB 44A, a standardized connection for computer peripherals that defines cables, connectors and communication protocols used to connection, communication and power between media player 42 and removable storage device or other storage devices, such as a thumb drive 44.1. Another in/output port 44B includes local area network (LAN), whether wired or wireless, such as wireless LAN or WLAN 802.11 44B (local area network), a standardized communication protocol to enable communication between computer 42 and the Internet, Wi-Fi, 3G, 4G or cloud C via 802.11 device 44.2. Still another in/output port 44C includes video graphics array (VGA) or the like a standardized communication protocol to enable communication between a video source, such as media player 42 to a display device, such as flat panel display 18. It is contemplated herein that other media player, computer, processor, memory, data storage, in/output communication electronics, protocol, standard, and port(s) or the like known to one of ordinary skill in the art may be utilized herein. Moreover, data and communication between media player 42 and electronic devices may be accomplished via system bus or a connection, cable, ribbon cable or the like shown in positions 44A-D.

Next, in/output port 44C includes video graphics array (VGA) a standardized communication protocol to enable communication between an electronics device, such as scalar board 43, preferably utilized to support display modes, panel resolutions, zoom, shrink, convert or process the video data image source received from media player 42 into a plurality of image sources or resolutions of images to be displayed on the display panel or sub-assemblies of such display panel, such as flat panel display 18 or convert video data signals (content) from one format or resolution to another such as low or standard resolution to a high-definition or divided digital video data signal (content) one or more display sub-assemblies for display on flat panel display 18. Moreover, scalar board 43 may preferably supply the timing signal such as vertical and horizontal synchronization signals, data enable signal, clock signal and/or plurality of image sources or resolutions of images data as output therefrom. Furthermore, scalar board 43 is preferably utilized to support display modes, panel resolutions, zoom, shrink, convert or process the video data image source received from media player 42 into a plurality of image sources or resolutions of images to be displayed on the display panel or sub-assemblies of such display panel, such as flat panel display 18 or communicate synchronization signals, data enable signal, clock signal and/or plurality of image sources or resolutions of images data convert video data signals (content) from one format or resolution to another such as low or standard resolution to a high-definition or divided digital video data signal (content) one or more display sub-assemblies for display on flat panel display 18 in an effort to obtain the best image quality for flat panel display 18. Still further, scalar board 43 may be configured to packet audio/video content or data, communicate, and synchronize the audio/video content or data to flat panel display 18.

Next, in/output port 44D video graphics array (VGA) or the like a standardized communication protocol to enable communication between scalar board 43 and an electronics device or control board, such as sending card 45 preferably utilized to divide the video data signal (content) received from scalar board 43 into packets, sections or display positions of the display panel or sub-assemblies of the display panel, such as flat panel display 18. Preferably, sending card 45 communicates the digital video data to one or more data driver or controller ICs, such as receive card 46. Preferably, sending card 45 communicates synchronization signals, data enable signal, clock signal and/or plurality of image sources or resolutions of images data, divided digital video data signal or other content, data or information received from scalar board 43 to sending card 45 and generates a data timing control signal for controlling operation timing of receive cards 46 based on a timing signal such as vertical and horizontal sync signals, data enable signal, clock signal and the like received from scalar board 43. Preferably, one or more receive cards 46 preferably daisy chained via one or more connector, cable, wire or the like, such as CAT5 47 a standard data communication twisted cable and connectors between electronic devices.

It is contemplated herein that functionality set for above for individual elements of media player 40, such as scalar board 43 and sending card 45 may be interchangeable between such electronic devices and/or combined into an individual element or one or more elements.

Next, each receive cards 46 is preferably connected and communicates the digital video data to LED modules, other display technology or the like, such as one or more display sub-assemblies 54 (14×3=126 shown or as preferred 7×3=21, 2 blocks per sub-assemblies 54) of the display panel (shown in FIG. 7A), such as flat panel display 18 via one or more connector, cable, wire or the like, such as data ribbon cable 49, a standard data communication multi-wire cable and connectors between electronic devices, such as one or more display sub-assemblies 54 and one or more receive cards 46 and between one or more display sub-assemblies 54.

It is contemplated herein that flat panel display 18 and/or its one or more display sub-assemblies 54 may incorporate touch screen technology to integrate feedback from a viewer of flat panel display 18.

It is contemplated herein that flat panel display 18 may be divided into any subset of one or more display sub-assemblies 54.

Moreover, one or more connector, cable, wire or the like may be provided to connect and communicate audio/video content and control signals (data) between media player and distribution system 40 and sections or display positions of the display panel or sub-assemblies 54 of the display panel, such as flat panel display 18 to provide the necessary power and commands to make the light emitters of one or more display sub-assemblies 54 emit light in a desired manner. Preferably each of one or more display sub-assemblies 54 may have a controller, driver, and/or communication circuit or chip (preferably 7×3=21) connected and communicating audio/video content and control signals (data) between one or more display sub-assemblies 54 and one or more receive cards 46 via data ribbon cable 49. Moreover, each of the light emitters of one or more display sub-assemblies 54 may preferably be provided ready for snap in to sub-frame 71

(shown in FIG. 2) for easy installation or snapped out of sub-frame 71 to swap a failed or underperforming sub-assemblies 54.

In addition, thumb drive 44.1 or content available via the cloud C enables the quick accessibility and storage of digital content and quick change out via plug and play or click and play access to digital content for display on flat panel display 18. In use, media player 42 searches for a playable data file and distribute such file for display on flat panel display 18. It is contemplated herein that other communication technologies known now or in the future to one of ordinary skill in the art are incorporated herein.

Preferably, one or more capture device 15 are utilized to capture a multi-perspective image of a viewer and/or environmental data for media player and distribution system with software (such as multi-perspective software) to capture, organize, format, distribute, and/or display a full size reorganized formatted image of a viewer and/or environmental data positioned. approximate mobile display system 10 on flat panel display 18. (Functionality feature)

It is contemplated herein that two or more capture device 15 and media player and distribution system 40 may be utilized to capture, organize, format, distribute, and display a full size, full perspective image (from multiple images from two or more capture device 15) of a viewer positioned approximate mobile display system 10 on flat panel display 18 and manipulate an image of the viewer to integrate product or service offerings with an image of the viewer. Moreover, media player and distribution system 40 may be utilized with software (such as image manipulation software) to capture, organize, format, distribute, and/or display content for display on flat panel display 18, including full size image of the viewer on the display with product or service offerings integrated into the image of the viewer being displayed. (Functionality feature)

Furthermore, media player and distribution system 40 may be utilized with software (such as mirror image or inverted image software) to generate content for display on flat panel display 18, including full size mirror image of the viewer on the display and integrate product or service offerings with the image of the viewer. (Functionality feature)

Still further, media player and distribution system 40 may be utilized with software (such as talking and motion avatar software) to generate content for display on flat panel display 18, including full size avatar or digital mannequin. to engage and communicate with a viewer to provide, for example, directions, information, special offers, coupons or other incentives, previews and the like. (Functionality feature)

It is still further contemplated herein that two or more capture device 15 and media player and distribution system 40 may be utilized to capture, organize, format, distribute, and display a full size, full perspective image (from multiple images from two or more capture device 15) of a viewer positioned approximate mobile display system 10 for distribution and display on a remote flat panel display 18. Moreover, media player and distribution system 40 may be utilized with software (such as telepresence software) to capture, organize, format, distribute, and/or display content for display on a remote flat panel display 18, including full size, full perspective image of the viewer on the display with product or service offerings integrated into the image of the viewer being displayed. A virtual presence or telepresence system includes flat panel display having a structural matrix configured to arrange a plurality of spaced pixel elements. A plurality of spaced pixel elements or light emitters 72 collectively forms an active visual area wherein an image is displayable. At least one image capture device or two or more capture device 15 is disposed within the active visual area for capturing an image. (Functionality feature)

It is further contemplated herein that full-size digital manikins may be used in places where customers or viewers can approach mobile display system 10 and by utilizing capture device 15 ask questions and generate answers. For example, mobile display system 10 may provide services such as way finding, directions, maps, locations, operating hours, discounts, show tickets, and other things. Since mobile display system 10 is full-sized and because the person appears real it's significantly increases the probability and facilitates comfort on behalf of the customer to actually engage the virtual person in a conversation; and thereby, receive the information that the customers is looking to receive.

It is further contemplated herein that other media players and/or storage technologies known now or in the future to one of ordinary skill in the art are incorporated herein.

Referring again to FIG. 4 there is illustrated an additional in/output port 44E includes digital visual interface (DVI) 48 a standardized communication protocol to enable communication or input of uncompressed audio/video content. Preferably, in/output port 44E connects and communicates therebetween an electronics device utilized to connect a video source, such as a VCR, DVD, laptop, computer or the like to a display device, such as flat panel display 18. Preferably, in/output port 44E includes digital visual interface (DVI) 48 to communicate uncompressed audio/video content and/or test audio/video content to scalar board 43 and for display on flat panel display 18.

Moreover, in/output port 44C, such as video graphics array (VGA) 44.3, one of many standardized connector display standards, which connects display controller, such as LED controller including scalar board 43 and sending card 45, to computer 42. Preferably, scalar board 43 is an electronics device for converting video signals from one format or resolution to another such as low or standard resolution to a high-definition for display on flat panel display 18 to obtain the best image quality for flat panel display 18. Sending card 45 is preferably connected to scalar board 43 and functions to communicate, synchronize and packet, the audio/video content to flat panel display 18.

Figure 5:
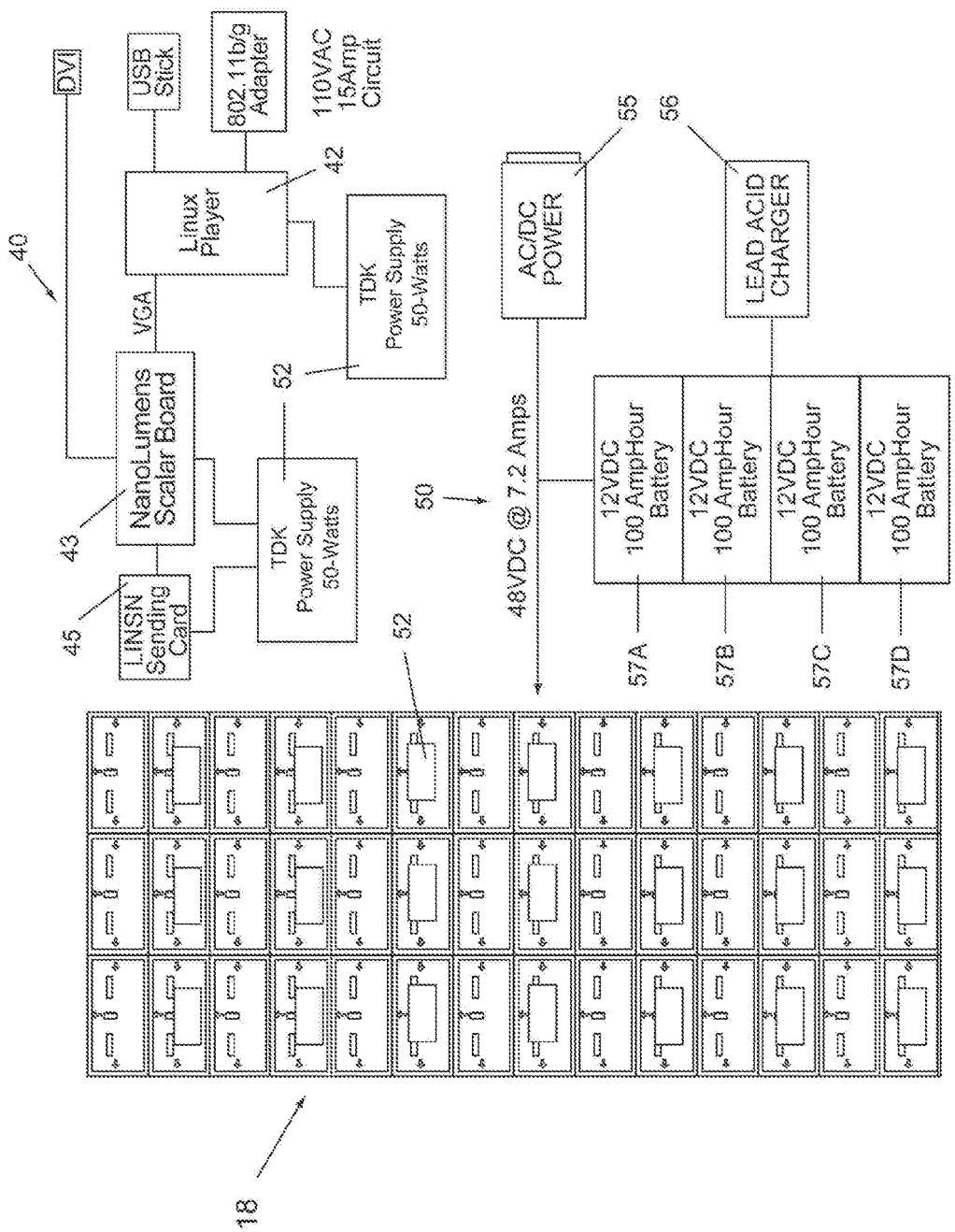
FIG. 5 is block diagram of an exemplary DC power supply in use to power mobile display system of FIG. 1.

Referring now to FIG. 5 by way of example, and not limitation, there is illustrated an example embodiment of a continuation block diagram of an exemplary media player 40 of FIG. 4, DC power supply system 50 and regulator boards 52 (portable power supply system). Preferably, DC power supply system 50 includes AC to DC power converter 55 (preferably specified at 110 VAC to 48 VDC at 7.2 Amps and 350 W), one or more DC batteries 57A-D (preferably capable of providing 12V DC at 100 AHr), and battery charger 56. Preferably, DC power supply system 50 supplies DC to one or more electric loads of media player 40. It is contemplated herein that other DC power supply system 50 and regulator boards 52 known to one of ordinary skill in the art may be incorporated herein. Preferably, flat panel display 18 is configured with one or more (preferably 7×3=21 shown) regulator boards 52 in a star configuration. DC cable assembly 51 (preferably specified at AWG#14) is configured to connect each of the one or more (preferably 7×3=21 shown) regulator boards 52 to each of the one or more display sub-assemblies 54. DC power supply system 50 is preferably configured to deliver constant voltage, current, and/or power to regulator boards 52 to power LEDs, such as one or more display sub-assemblies 54, which comprises flat panel display 18. In addition, DC power supply system 50 preferably provides power to additional (shown three) regulator boards 52 configured to deliver constant voltage, current, and/or power to media player 42, scalar board 43 and an electronics device or control board, such as sending card 45 of media player 40.

Regulator boards 52 (preferably specified at 5 VDC 3 A at 15 W) may include additional features such as constant current to series and series-parallel connected LED arrays of varying number and type, LED dimming via pulse width modulation (PWM), broken/open LED protection, low-power shutdown and thermal shutdown features.

It is contemplated herein that each of the one or more display sub-assemblies 54 may have dedicated regulator boards 52 configured to deliver constant voltage, current, and/or power thereto.

It is contemplated herein that DC power supply system enables mobile display system 10 to be transported independent of AC power feeds or supply.

Figure 6:
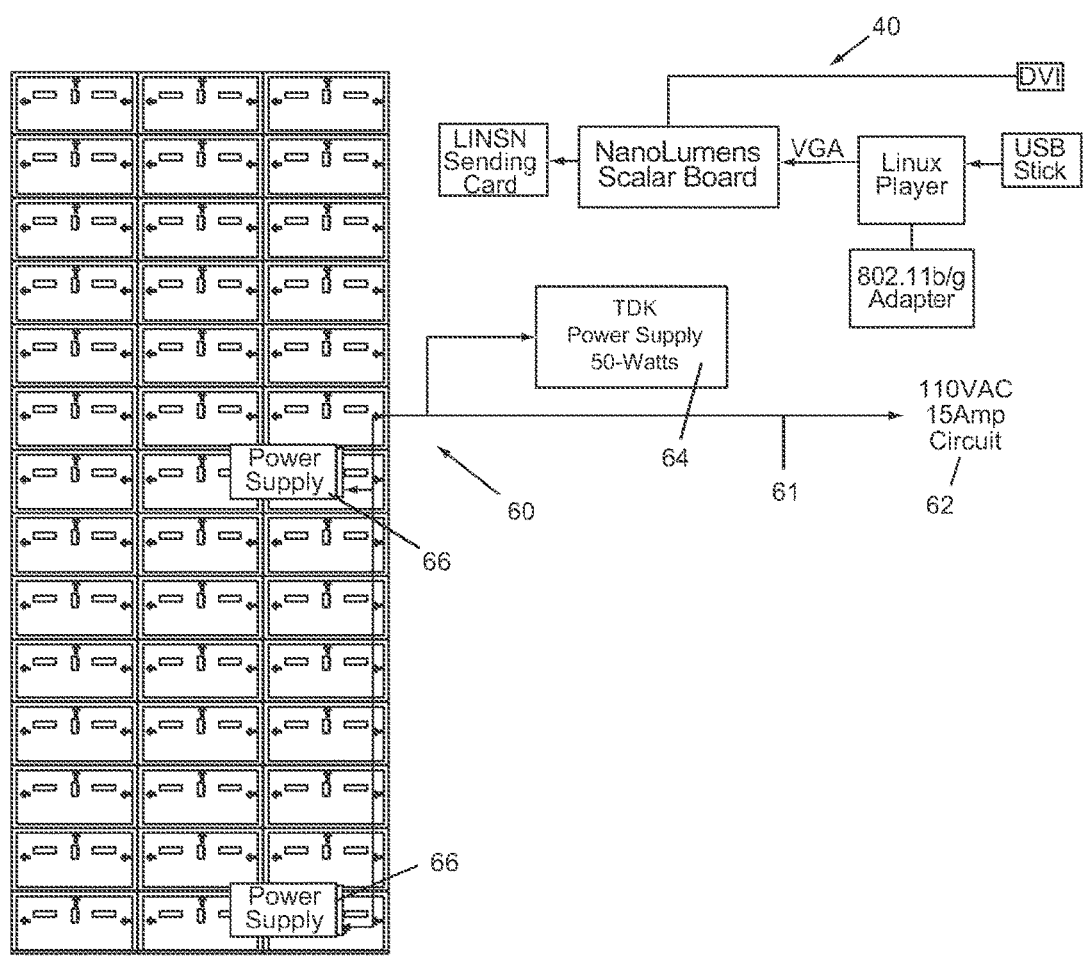
FIG. 6 is block diagram of an exemplary AC to DC power supply in use to power mobile display system of FIG. 1.

Referring now to FIG. 6 by way of example, and not limitation, there is illustrated an example embodiment of a continuation block diagram of an exemplary media player 40 of FIG. 4 and AC to DC power supply system 60 (portable power supply system). Preferably, AC power supply system 60 includes AC outlet 62 (preferably specified at 110 VAC, 15 A breaker), AC cable assembly 61 (preferably specified at 3 conductor AWG#10), and one or more AC power supplies 66 (preferably specified at 115 VAC, 10 A and output 5 VDC 240 W). AC power supply system 60 preferably supplies DC power to one or more electric loads of media player 40. AC power supply system 60 is preferably configured to deliver constant voltage, current, and/or power to regulator boards to power LEDs, such as one or more display sub-assemblies 54, which comprises flat panel display 18. It is contemplated herein that other AC to DC power supply system 60 and regulator boards 52 known to one of ordinary skill in the art may be incorporated herein.

AC power supply system 60 is preferably configured to deliver constant voltage, current, and/or power to regulator boards 52 to power LEDs, such as one or more display sub-assemblies 54, which comprises flat panel display 18. In addition, AC power supply system 60 preferably provides power to additional (shown three) regulator boards 52 configured to deliver constant voltage, current, and/or power to media player 42, scalar board 43 and an electronics device or control board, such as sending card 45 of media player 40.

Figure 7A:
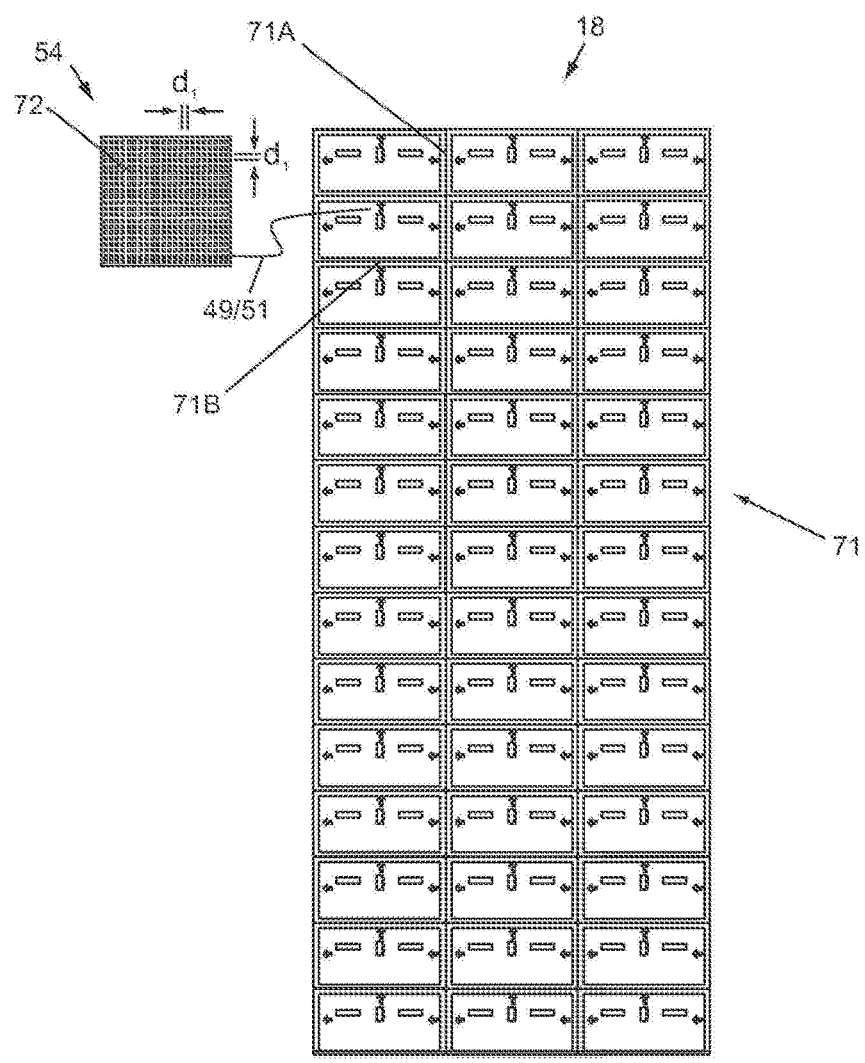
FIG. 7A and 7B are perspective views of steps of insertion of a sub-assemblies LED unit into the LED display.

Referring now to FIG. 7A by way of example, and not limitation, there is illustrated an example embodiment of one of the one or more display sub-assemblies 54 unattached from sub-frame 71 shown connected via power and data connection, such as DC cable assembly 51 and data ribbon cable 49. Preferably, one or more display sub-assemblies 54 may be easily switched out by disconnecting an old or existing one of one or more display sub-assemblies 54 and reconnecting a new one of one or more display sub-assemblies 54 wherein such connection(s) are between one of one or more receive cards 46 shown in FIG. 4 and/or DC cable assembly 51 between one of one or more regulator boards 52 and one of one or more display sub-assemblies 54 to provide the necessary power and commands to make the light emitters 72 of one or more display sub-assemblies 54 emit light in a desired manner.

Preferably, one or more display sub-assemblies 54 includes one or more pixels or cells, such as light emitters 72 including light emitting diodes (LED) or other light emitting technologies, such as, by way of example and not limitation, liquid crystal display (LCD), backlit LCDs, electroluminescence, plasma tubes or cells, or plasma display panels (PDP), organic light emitting diode (OLED) and the like (light emitters 72) In an exemplary embodiment, light emitters 72 are preferably sized relative to pixel gap d1 so that the gap line between light emitters is less noticeable while still providing a desired resolution for sub-assemblies 54 and flat panel display 18. For example, in the exemplary embodiment shown in FIG. 7A, each light emitter 72 of one or more display sub-assemblies (preferably 7×3=21 spaces shown) may include P 4.0 mm DOT Matrix Nixel 64×32 resolution LED or other light source known to one of ordinary skill in the art. Preferably, light emitter 72 are positioned distance d1 between each neighboring light emitter 72 configured as an array or matrix of light emitter 72 to form each of one or more display sub-assemblies 54.

It is contemplated herein that distance d1 between each neighboring light emitter 72 may include 1 mm to 10 mm depending on the desired resolution, viewing distance and acceptable price point for flat panel display 18.

Referring again to FIG. 7A by way of example, and not limitation, there is illustrated thereto sub-frame 71 of flat panel display 18. Preferably, inner panel, surface, frame or cross bars, such as sub-frame 71 supported by support structure 14 shown in FIG. 1 and FIG. 2, and further includes vertical members 71A and horizontal members 71B configured to cross one another forming a lattice framework to releasably affix each of one or more display sub-assemblies 54 thereto. Moreover, each of one or more display sub-assemblies 54 is releasably affixed to vertical members 71A and/or horizontal members 71B by magnetic connection or the like. For example, if vertical members 71A and horizontal members 71B are formed of steel or other ferrous material then magnets may be affixed to the perimeter of each of one or more display sub-assemblies 54 to releasably affix each of one or more display sub-assemblies 54 to vertical members 71A and/or horizontal members 71B. Alternatively, if vertical members 71A and horizontal members 71B are formed of aluminum or other nonferrous material then magnets or the like may be affixed to vertical members 71A and horizontal members 71B and magnets or the like may be affixed to the perimeter of each of one or more display sub-assemblies 54 to releasably affix each of one or more display sub-assemblies 54 to vertical members 71A and/or horizontal members 71B.

In an exemplary embodiment, light emitters 72 are preferably spaced apart relative to pixel gap d1 between light emitter 72 such that pixel gap d1 is less noticeable to an observer.

Figure 7B:
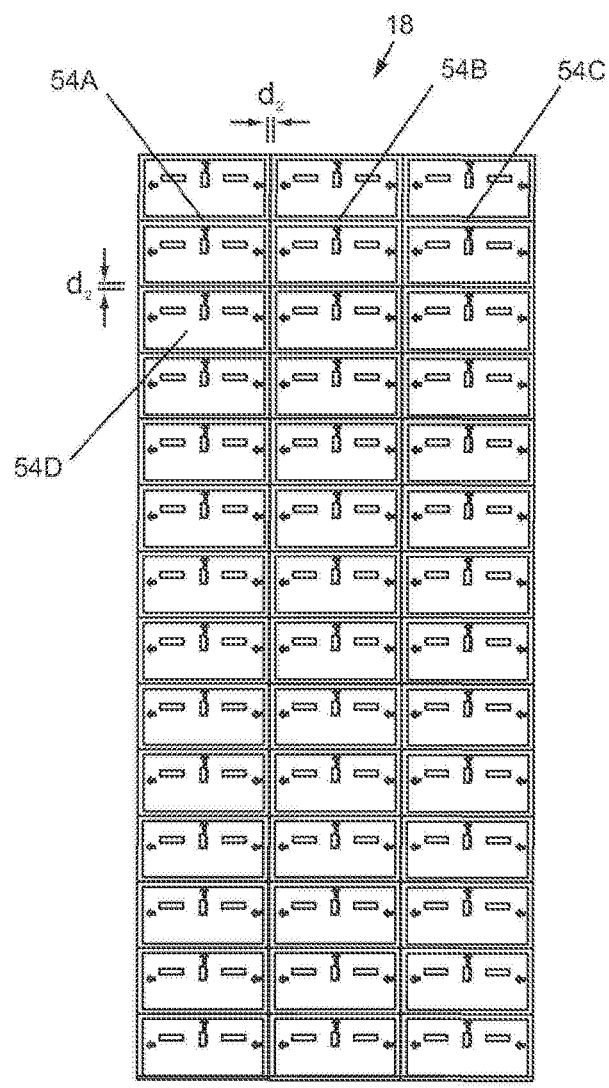

Referring now to FIG. 7B by way of example, and not limitation, there is illustrated an example embodiment of flat panel display 18 having one of one or more display sub-assemblies 54 positioned therein. Preferably, each neighboring assembly positioned therein flat panel display 18 is configured having a space there-between, such as sub-assembly gap d2. In a preferred embodiment, sub-assembly gap d2 between neighboring sub-assemblies 54 is preferably approximately equal to pixel gap d1 shown in FIG. 7A, between individual light emitters 72 shown in FIG. 7A, of one of one or more display sub-assemblies 54, such that pixel gap d1 and sub-assembly gap d2 is less noticeable or seamless to an observer.

In an exemplary embodiment of one or more display sub-assemblies 54, light emitter 72 are preferably of a size relative to the pixel gap d1 to make the pixel gap line less noticeable to a. viewer. For example, the pixels may be of a size relative to the size of pixel gap d1 so as to provide a display of a desired resolution in which pixel gap d1 is not as pronounced or distracting to the viewer. Moreover, sub-assembly gap d2 is preferably of a size approximately equal to the pixel gap d1 to make sub-assembly gap d2 less noticeable or seamless to a viewer. This relationship and sizing may depend on a number of factors, including, but not limited to, viewing distance, contrast ratio, brightness, and viewing environment.

One problem with prior art displays is that sub-assembly gap d2 is of such size that gap lines are visible in the resulting display which is distracting to a viewer and renders an image of poorer quality. It is contemplated herein that if sub-assembly gap d2 is to close or narrow then a bright line may appear between a perimeter row of light emitter 72 and if sub-assembly gap d2 is too far apart or wide dark line may appear between a perimeter row of light emitter 72, thus such gaps would be noticeable to and distracting to a viewer. Alternatively, because there are no light emitters 72 to produce light at sub-assembly gap d2, the gap may appear as a darkened area of a display, referred to as a "pixel gap line."

It is contemplated herein that if sub-assembly gap d2 is equal pixel gap d1 or if such gaps vary by no more than +/−20% from equal (d1=d2) then such gaps are preferably less noticeable to and distracting to a viewer.

Figure 8:
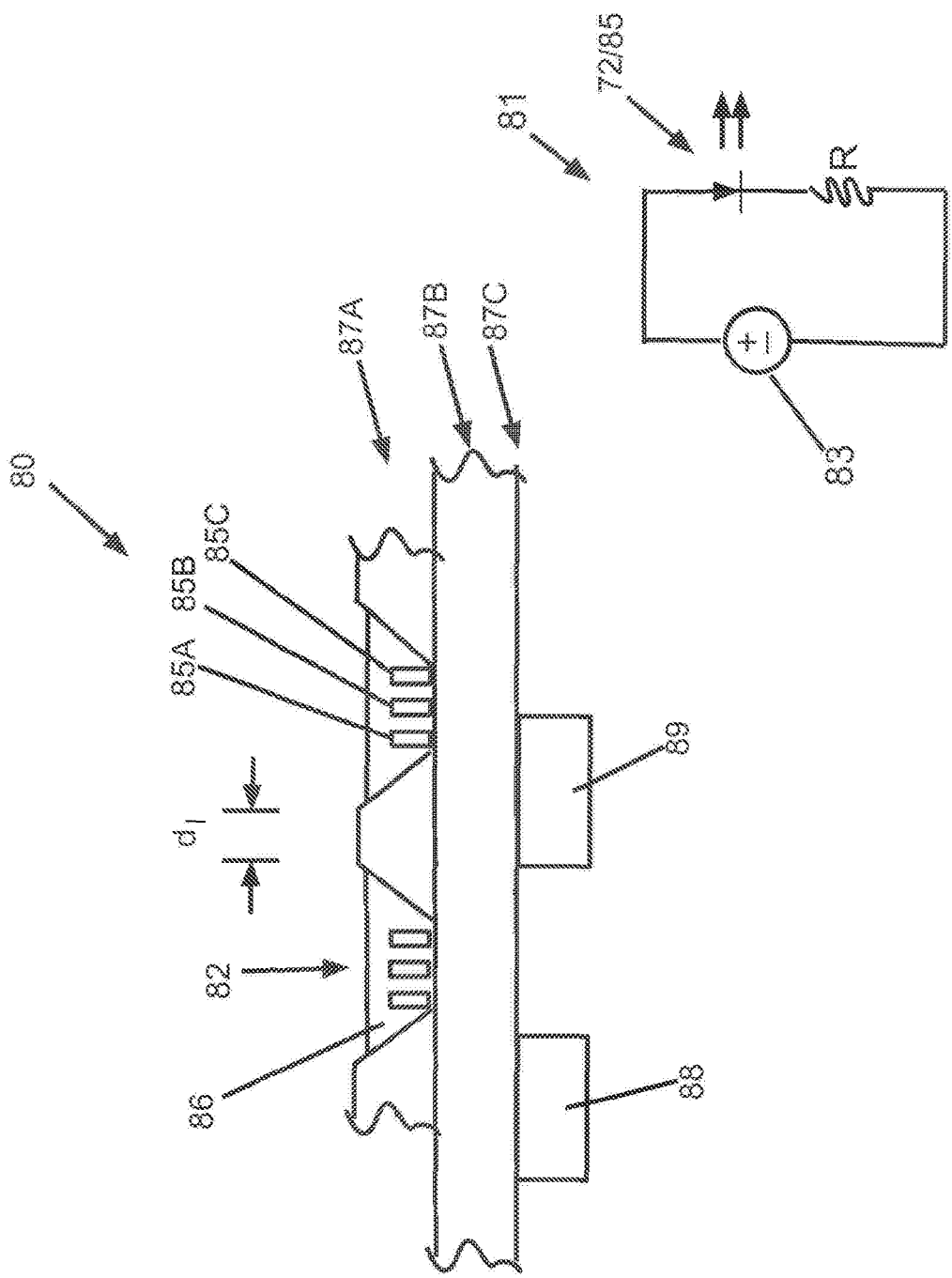
FIG. 8 is a cross sectional view of a sub-assembly of LEDs.

Referring now to FIG. 8 by way of example, and not limitation, there is illustrated an example embodiment of a cross section 80 of one of one or more display sub-assemblies 54 shown in FIG. 7A, configured with plurality of light emitter 72. One problem with prior art displays is individual light emitter 72 are raised above the outer surface of flat panel display 18 and when bumped or pushed on such individual light emitter 72 would break off or lose connection to power and command circuitry. In an exemplary embodiment, a plurality of light emitter 72 are preferably configured or formed on a rigid substrate that serves as one of one or more display sub-assemblies 54 of flat panel display 18 shown in FIG. 7A.

Preferably, light emitter 72 may include subpixels 85 which may be divided into groupings, such as groupings of three subpixels 85, to form pixels or light emitter 72. For example, subpixels 85 that emit red 85A, green 85B and blue 85C light may be grouped together to form an RGB pixel light emitter 72. Preferably, light emitter 72 may be positioned in a matrix formation as "chip on board" printed circuit board (PCB) 87B configured with pixel gap d1 therebetween adjacent light emitters 72. In order for flat panel display 18 to be configured as rigid surface, tough face or uniform surface that resists abrasion and is easy to clean, each light emitter 72 is preferably positioned in a bowl or divot, such as cup 82 formed in upper layer 87A. Preferably, one or more cups 82 are encapsulated with plastic or transparent filler to allow light emission through the substrate or to blend RGB light or the like such as optical epoxy 86. Preferably, upper layer 87A and printed circuit board (PCB) 87B may be held under pressure while optical epoxy 86 cures. Moreover, printed circuit board (PCB) 87B is preferably shown with integrated circuits such as 8×8 drive circuit 89 and COM circuit 88 connected via power and data connection, such as DC cable assembly 51 shown in FIG. 7A, and data ribbon cable 49 shown in FIG. 7A. Preferably, printed circuit board (PCB) 87B is configured to connect chive 89 and COM 88 and one or more light emitter 72 to emit light in a desired manner on one of one or more display sub-assemblies 54. Additionally, the light emitted by light emitter 72 may be converted or filtered to provide the desired light output; for example, the pixels could be formed of blue LEDs that are filtered or are color converted and filtered.

It is contemplated herein that cross section 80 may be provided in other shapes and arranged to provide one or more display sub-assemblies 54 of an appropriate size, shape, and/or contour to provide flat panel display 18 with a desired display configuration. Moreover, flat panel display 18 may include flexible substrate printed circuit board (PCB) 87B and/or one or more cutouts or bend points in pixel gap d1 and/or sub-assembly gap d2 shown in FIG. 7A, and the greater the number of bending points that can be provided the greater the flexibility or curvature of flat panel display 18. For example, if it is desirable to provide a greater amount of flexibility or curvature in one direction of flat panel display 18 than another then cutouts or bend points in pixel gap d1, sub-assembly gap d2, and/or one or more display sub-assemblies 54 can be shaped to provide such flexibility by arranging a larger number of flexible gaps in the one direction than the other.

Other arrangements, such as by way of example and not limitation, include a mono-color display in which all subpixels 85 or pixels emit the same color light. Moreover, subpixels 85 may have different properties in order to provide desired properties for light emitter 72. For example, light emitter 72 may comprise red 85A, green 85B and blue 85C subpixels 85 that together form an RGB pixel. The intensity of the individual subpixels 85, red 85A, green 85B and blue 85C, can be manipulated to provide light having desired characteristics, such as a desired light color or brightness.

Referring again to FIG. 8 by way of example, and not limitation, there is illustrated an example embodiment LED circuit 81. Preferably, LED circuit 81 is an exemplary power circuit used to power light emitter 72. LED circuit 81 preferably includes light emitter 72, resistor R, and power supply 83. This simple representative LED circuit 81 consists of power supply 89 (including drive circuit 89 and COM circuit 88 connected via power and data connection) and two components connected in series: light emitter 72, current limiting resistor R. Optionally a switch may be introduced to open and close the circuit or light or turn off light emitter 72. It is contemplated herein that more complicated LED circuit 81 known to one of ordinary skill in the art may be used to improve energy efficiency of LED circuit 81.

Figure 9:
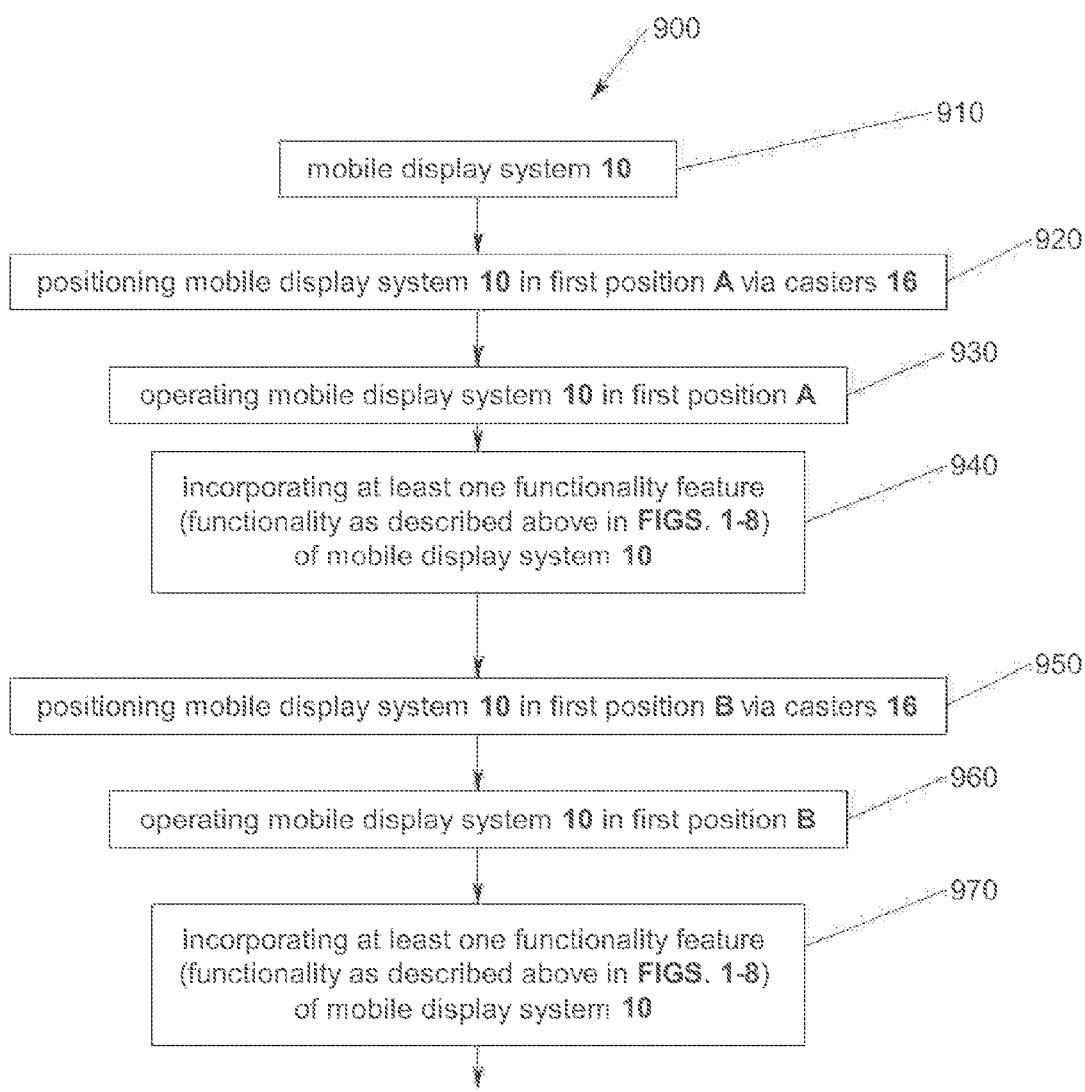
FIG. 9 is a flow diagram of a method of using mobile display system.

Referring now to FIG. 9, there is illustrated a flow diagram 900 a method of using mobile display system 10. In block or step 910, providing mobile display system 10 configured as described above in FIGS. 1-8. In block or step 920, positioning mobile display system 10 in first position A via rolling on said casters 16. In block or step 930, operating mobile display system 10 in first position A. Preferably, operating mobile display system 10 includes operation of media player 40, DC power supply system 50, AC to DC power supply system 60, two or more capture device 15, embodiment of a cross section 80 of one of one or more display sub-assemblies 54, and/or LED circuit 81. In block or step 940, incorporating at least one functionality feature (functionality as described above in FIGS. 1-8) of mobile display system 10. In block or step 950, repositioning mobile display system 10 in second position 13 via casters 16 (first position A is a distance apart from second position B). In block or step 960, operating mobile display system 10 in second position B. In block or step 970, incorporating at least one functionality feature (functionality as described above in FIGS. 1-8) of mobile display system 10.

The foregoing description and drawings comprise illustrative embodiments of the present invention. Having thus described exemplary embodiments, it should be noted by those ordinarily skilled in the art that the disclosures within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains, having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

The invention claimed is:

1. A method of providing a light emitting display system on a support structure, the method comprising the steps of:
    a) providing a plurality of light emitting display sub-assemblies attachable to said support structure, the plurality of light emitting display sub-assemblies collectively creating a visual display having no perceivable gaps or overlaps between adjacent light emitting display sub-assemblies;
    b) constructing each of said light emitting display sub-assemblies according to the steps comprising:
        i) affixing to a substrate a plurality of light emitting elements, the edges of the substrate defining a contiguous perimeter;
        ii) arranging said plurality of light emitting elements in a matrix formation;
        iii) providing, between each pair of adjacent light emitting elements, a pixel gap, thereby creating a plurality of pixel gaps;
        iv) spacing each of said plurality of pixel gaps so that all pixel gaps are substantially the same size;
        v) disposing on said substrate, within said plurality of pixel gaps, one or more bend points, each of said one or more bend points characterized in that said substrate is curveable around said bend point;
        vi) defining a portion of said plurality of light emitters, each light emitter of said portion being spaced from said contiguous perimeter by a distance about one half the size of said pixel gap;
    c) disposing said plurality of light emitting display sub-assemblies on said support structure so that a portion of said contiguous perimeter of each of plurality of light emitting display sub-assemblies abuts a portion of said contiguous perimeter of an adjacent light emitting display sub-assembly.

2. The method of claim 1 further comprising the steps of:
    a) configuring one or more display sub-assemblies to bend around one or more of said bend points thereby causing at least a portion of said visual display to form a curved visual display, said curved visual display having no perceivable gaps or overlaps between adjacent light emitting display sub-assemblies.

3. The method of claim 1 further comprising the steps of:
    a) providing a mobile base attached to the support structure.

4. The method of claim 1 further comprising the steps of:
    a) disposing a capture device within one of said plurality of pixel gaps, the capture device operative to capture one or more images from the environment in front of said visual display;
    b) capturing one or more images from the environment in front of said visual display by means of said capture device.

5. The method of claim 1 further comprising the steps of:
    a) disposing a capture device within one of said plurality of pixel gaps, the capture device operative to capture audio from the environment in front of said visual display;
    b) capturing audio from the environment in front of said visual display by means of said capture device.

6. A method of providing a light emitting display system on a support structure, the method comprising the steps of:
    a) providing a plurality of light emitting display sub-assemblies attachable to said support structure, the plurality of light emitting display sub-assemblies collectively creating a visual display having no perceivable gaps or overlaps between adjacent light emitting display sub-assemblies;
    b) constructing each of said light emitting display sub-assemblies according to the steps comprising:
        i) affixing to a substrate a plurality of light emitting elements, the edges of the substrate defining a contiguous perimeter;
        ii) arranging said plurality of light emitting elements in a matrix formation;
        iii) providing, between each pair of adjacent light emitting elements, a pixel gap, thereby creating a plurality of pixel gaps;
        iv) spacing each of said plurality of pixel gaps so that all pixel gaps are substantially the same size;
        v) disposing on said substrate, within said plurality of pixel gaps, one or more bend points, each of said one or more bend points characterized in that said substrate is curveable around said bend point;
        vi) defining a portion of said plurality of light emitters, each light emitter of said portion being spaced from said contiguous perimeter by a distance about one half the size of said pixel gap;
    c) disposing said plurality of light emitting display sub-assemblies on said support structure so that a portion of said contiguous perimeter of each of plurality of light emitting display sub-assemblies abuts a portion of said contiguous perimeter of an adjacent light emitting display sub-assembly;
    d) providing a second plurality of light emitting display sub-assemblies attachable to said support structure, the plurality of light emitting display sub-assemblies collectively creating a second visual display having no perceivable gaps or overlaps between adjacent light emitting display sub-assemblies;
    e) further disposing said second plurality of light emitting display sub-assemblies so that said second visual display is not contiguous with said visual display.

7. The method of claim 6 further comprising the steps of:
    a) configuring one or more display sub-assemblies to bend around one or more of said bend points thereby causing at least a portion of said visual display to form a curved visual display, said curved visual display having no perceivable gaps or overlaps between adjacent light emitting display sub-assemblies.

8. The method of claim 6 further comprising the steps of:
    a) providing a mobile base attached to the support structure.

9. The method of claim 6 further comprising the steps of:
a) disposing a capture device within one of said plurality of pixel gaps, the capture device operative to capture one or more images from the environment in front of said visual display;
b) capturing one or more images from the environment in front of said visual display by means of said capture device.

10. The method of claim 6 further comprising the steps of:
a) disposing a capture device within one of said plurality of pixel gaps;
b) capturing audio from the environment in front of said visual display by means of said capture device.

11. A method of using a light emitting display system, the method comprising the steps of:
a) providing a plurality of light emitting display sub-assemblies attached to a support structure having a mobile base, the plurality of light emitting display sub-assemblies collectively creating a visual display having no perceivable gaps or overlaps between adjacent light emitting display sub-assemblies;
b) constructing each of said light emitting display sub-assemblies according to the steps comprising:
   i) affixing to a substrate a plurality of light emitting elements, the edges of the substrate defining a contiguous perimeter;
   ii) arranging said plurality of light emitting elements in a matrix formation;
   iii) providing, between each pair of adjacent light emitting elements, a pixel gap, thereby creating a plurality of pixel gaps;
   iv) spacing each of said plurality of pixel gaps so that all pixel gaps are substantially the same size;
   v) disposing on said substrate, within said plurality of pixel gaps, one or more bend points, each of said one or more bend points characterized in that said substrate is curveable around said bend point;
   vi) defining a portion of said plurality of light emitters, each light emitter of said portion being spaced from said contiguous perimeter by a distance about one half the size of said pixel gap;
c) disposing said plurality of light emitting display sub-assemblies on said support structure so that a portion of said contiguous perimeter of each of plurality of light emitting display sub-assemblies abuts a portion of said contiguous perimeter of an adjacent light emitting display sub-assembly;
d) positioning the light emitting display system by moving said mobile base;
e) displaying image or video content on the light emitting display system comprising marketing materials to inform customers of product offerings.

12. The method of claim 11 further comprising the steps of:
a) disposing a capture device within one of said plurality of pixel gaps, the capture device operative to capture one or more images from the environment in front of said visual display;
b) capturing one or more images from the environment in front of said visual display by means of said capture device;
c) displaying a portion of one or more of captured images on the light emitting display system.

13. The method of claim 11 further comprising the steps of:
a) disposing a capture device within one of said plurality of pixel gaps, the capture device operative to capture one or more images from the environment in front of said visual display;
b) capturing one or more images from the environment in front of said visual display by means of said capture device;
c) displaying simultaneously both a portion one or more of captured images on the light emitting display system and a portion of said marketing materials.

* * * * *